April 26, 1966   O. W. BONNAFE   3,247,735
DRIVE FOR BROACHING MACHINES AND THE LIKE
Filed Dec. 20, 1962   2 Sheets-Sheet 1

Inventor
Oliver W. Bonnafe
by Roberts Cushman & Grover
Att'ys

April 26, 1966  O. W. BONNAFE  3,247,735
DRIVE FOR BROACHING MACHINES AND THE LIKE
Filed Dec. 20, 1962  2 Sheets-Sheet 2

United States Patent Office 3,247,735
Patented Apr. 26, 1966

3,247,735
DRIVE FOR BROACHING MACHINES
AND THE LIKE
Oliver W. Bonnafe, Hudson, Mass., assignor to The Lapointe Machine Tool Company, Hudson, Mass., a corporation of Maine
Filed Dec. 20, 1962, Ser. No. 246,127
7 Claims. (Cl. 74—325)

This invention relates to a drive for machinery and especially to a speed-reduction unit having an input shaft to which a motor is drivably connected and an output shaft adapted to mount a gear, pulley, sprockets, or the like, for operating the machine.

For large heavy machinery, such as broaching machines, and the like, the speed-reduction unit is very large, the drive transmitting components within the unit are correspondingly large and heavy to handle and are immersed in a large quantity of oil and hence it is highly undesirable to have to make repairs or changes within the unit which, of necessity, require draining the oil and/or dismantling bearings, gears, shafts, and the like. In spite of this, in the past it has been customary to connect the main drive gear, pulley or sprockets of the machine being driven to the output shaft or some gear inside the unit to its shaft by a shear element in order to prevent the machine from being damaged by overloading and also to effect speed changes by replacing certain of the gears within the unit for gears of a different ratio. Failure of a shear element and the necessity of replacing it, or substitution of a pair of gears of different ratio within the unit to change the speed, thus incurred long delays in operation, a great deal of hard, heavy work and working conditions objectionable to the millwright.

The principal objects of this invention are to provide an improved speed-reduction drive including a shear connection for safety and change gears for efficient operation which are, respectively, accessible from externally of the speed-reducer, thus enabling replacement of a shear element which has failed without entering the speed-reduction housing or dismantling the shafts and gears therein and substitution of change gears of one ratio for gears of a different ratio for more efficient operation without disconnecting the motor. Another object is to provide a unit which is adapted to be used with a horizontal broaching machine of considerable length for transmitting power thereto from a side of the machine rather than an end, so as to keep the overall length to a minimum.

As herein illustrated, the drive comprises a housing, a drive shaft journaled in the housing with an end projecting therefrom, driving means mounted on and fixed to the projecting end of the shaft, a drive gear within the housing on the shaft, and a shear coupling connecting the drive gear to the drive shaft, the shear coupling being accessible through an opening in the housing remote from the driving means to permit replacement in the event of failure without having to enter the housing. The shear coupling is comprised of a sleeve fixed to the drive shaft, having a radial flange opposite the hub of the drive gear and one or more shear pins inserted through holes in the flange into correspondingly located holes in the hub, the pins being removable and replaceable through the opening in the housing thus enabling replacement of broken shear pins outside of the housing without dismantling the latter in any respect. The housing contains, in addition, second and third parallel shafts journaled therein at right angles to the drive shaft. The second shaft has one end projecting from the housing for connection to a drive motor and the other end projecting from the housing remote from the motor. The third shaft has an end projecting from the housing next to the projecting other end of the second shaft and a pair of change gears are mounted on the adjacent projecting ends of the second and third shafts externally of the housing, thus enabling replacement of the gears for others of a different ratio without disconnecting the motor or dismantling the components internally of the housing. The drive is completed within the housing by a fourth shaft journaled therein parallel to the drive shaft, a gear on the fourth shaft meshing with the drive gear on the drive shaft, and a worm and worm wheel connecting the fourth shaft with the third shaft. As illustrated, an outboard bearing supports the projecting end of the drive shaft externally of the housing, and the driving means is in the form of a pair of sprockets fixed to the portion of the drive shaft situated between the housing and the outboard bearing.

The invention will now be described in greater detail with reference to the accompanying drawings wherein.

Figure 1:
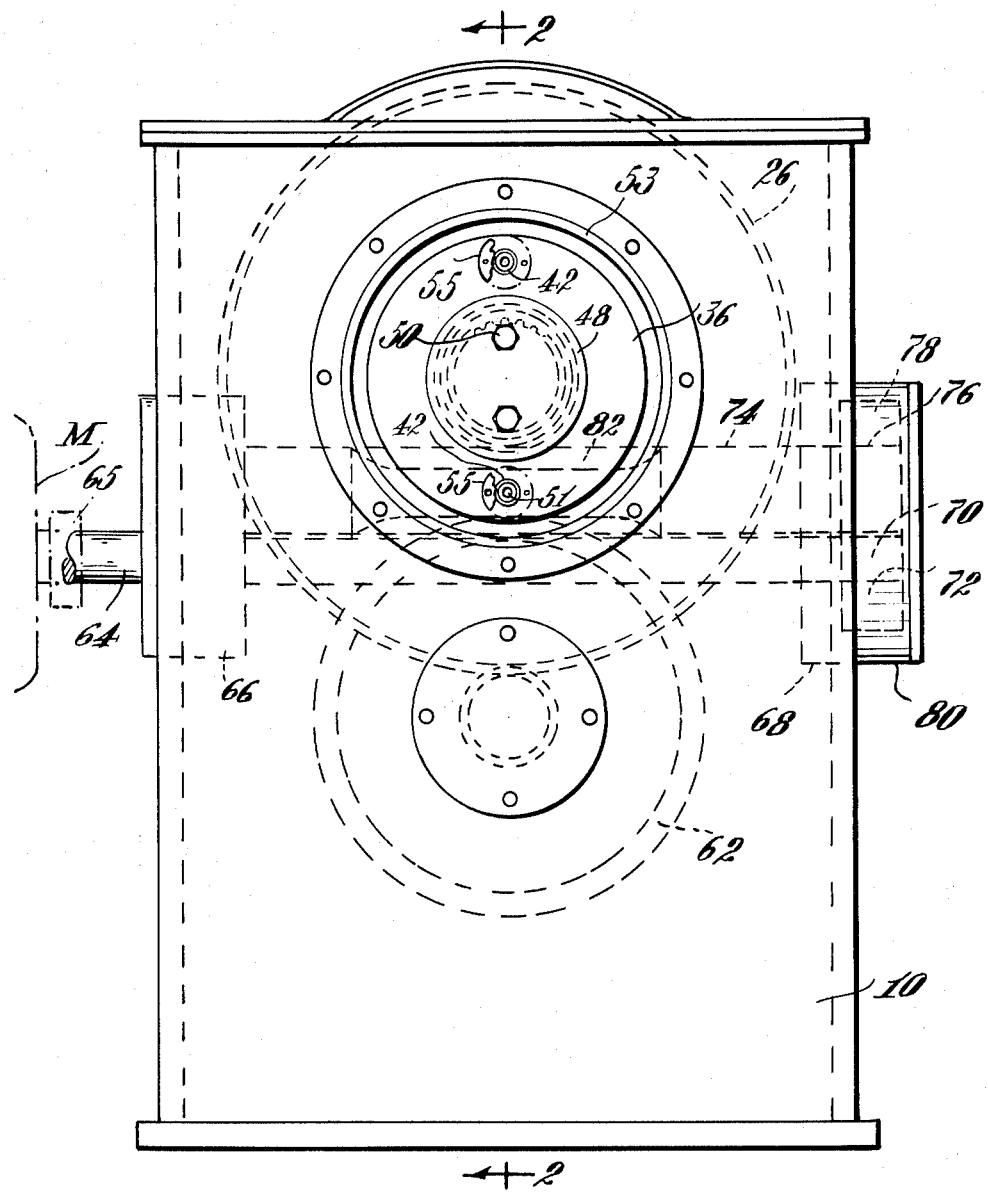
FIG. 1 is an elevation of the speed-reducer showing the input shaft at one side, the change gear housing at the other side, and the shear coupling at the front.

Referring to the drawings, the drive which constitutes a speed-reducer comprises a large metal housing 10 which supports a large diameter output or drive shaft 12 for rotation about a horizontal axis, with a portion 14 extending therefrom upon which driving means, in the form of a pair of sprockets 16, are mounted. The sprockets are made in three pieces and bolted together about the shoulders 14a at opposite ends of the portion 14. The portion of the shaft 12 in the housing is rotatably supported within fixed bearings 18 and 20 formed in opposed portions of the wall of the housing, and the portion 14 extending from the housing is supported in a fixed bearing 22 mounted at the upper end of a wall 24 spaced from the housing, the wall, in turn, being secured at its lower end to a horizontal extension of the bottom wall of the housing 10. The fixed bearings 18, 20 and 22 support conventional roller bearing assemblies 18a, 20a and 22a.

Figure 4:
FIG. 4 is an elevation of a shear pin showing the axial passage into which an implement may be thrust to effect its removal when it is broken.
Figure 2:
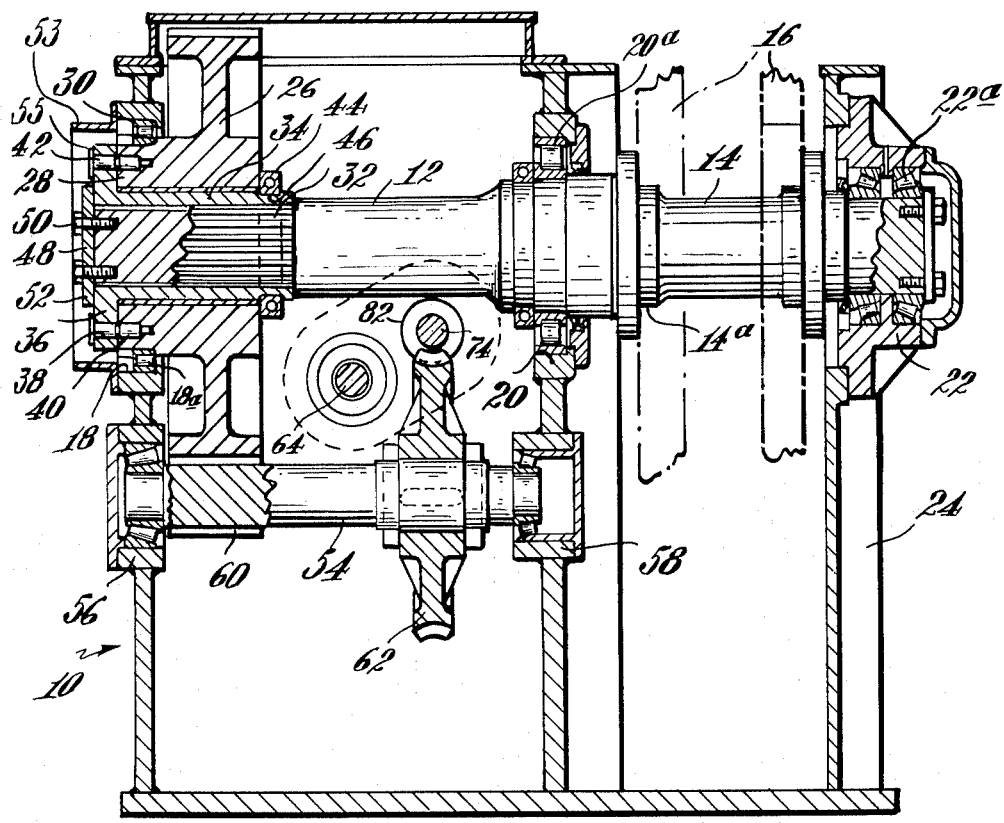
FIG. 2 is a vertical section taken on the line 2—2 of FIG. 1, showing parts in elevation.

The drive shaft 12 has on it, within the housing, a drive gear 26 and in order to provide for a shear coupling between the drive shaft 12 and its drive gear 26, which will be accessible from externally of the housing 10 and hence without having to empty the latter of oil or dismantle the driving components therein, the bearing 18 is made large enough to receive within it the hub of the drive gear 26, the outer end 28 of which is extended axially of the shaft 12 through the bearing opening 18 and is rotatably supported therein by the roller bearing assembly 22a. The drive shaft 12 has on it a plurality of longitudinally extending splines 32 interengageable with corresponding splines internally of a sleeve 34 mounted on the drive shaft between it and the hub of the drive gear 26. The outer end of the sleeve 34 has a radial flange 36 adjacent the outer end of the outwardly extending portion 28 of the hub and there are a plurality of registering holes 38 and 40 in the flange 36 and hub 28 into which are inserted shear pins 42, there being two such pins shown herein, it being understood that more may be employed if desired. The shear pins 42 provide the driving connection between the drive gear 26 and the drive shaft 12 and, as will be seen by reference to FIG. 2, can be removed and replaced through the bearing opening 18 from exteriorly of the housing and hence without draining the latter of oil or of dismantling or disturbing the drive in any manner. To expedite removal of broken shear pins they contain, as shown in FIG. 4, axial passages 51 of small diameter into which an implement may be thrust. To prevent the shear pins from accidentally working out of their holes cap plates 55 may be secured to the flange 36 over the outer end of each shear pin.

Endwise movement of the drive gear 26 on the drive shaft 12 is prevented by a ring bearing 44 seated in a groove 46 peripherally of the inner end of the sleeve 34 and by a cover plate 48 fastened to the outer end of the drive shaft by bolts 50, with a portion 52 thereof overlapping and engaged with the flange 36. A guard ring 53 is secured to the outer side of the bearing 28 to prevent accidental contact with the rotating end of the shaft, sleeve and cover.

A second shaft 54 (FIG. 2) is journaled in the housing in bearings 56 and 58 parallel to the shaft 12 and this shaft has on it a spur gear 60 which meshes with the drive gear 26 and a worm wheel 62, the latter being rotatable, as will now appear, to effect rotation of the drive gear 26 through the pinion 60.

Referring to FIG. 1, there is shown a motor M and an input shaft 64 connected thereto by a suitable coupling 65. The input shaft 64 is supported in the housing with one end projecting therefrom for connection to the motor in bearings 66 and 68 secured to the walls of the housing at right angles to the shafts 12 and 54. The opposite end 70 of the shaft 64 projects from the housing remote from the motor and has demountably mounted on it a change gear 72. A third shaft 74 is mounted within the housing parallel to the second shaft 64 with its ends journaled in the bearings 66 and 68 and this shaft has an end 76 projecting from the housing next to the end 70 on which is demountably mounted a change gear 78 which meshes with the gear 72. The gears 72 and 78 constitute change gears which may be quickly removed from the shafts and replaced by gears of different ratio to enable changing the speed of operation. The projecting ends of the shafts 70 and 76 and the change gears 72 and 78 are enclosed within a casing 80 secured to the side of the housing 10 and since the change gears are mounted at the side opposite the motor M, it is obvious that they may be changed quickly and easily without disconnecting the motor or any of the shafting and/or gears within the gear box so that the operator will be inclined to make the change whenever necessary.

The shaft 74 has on it a worm 82 which meshes with the worm wheel 62 thereby completing the drive from the motor M through the change gears 72, 78, the worm 82, the worm wheel 62, the spur gear 60 and the drive gear 26 to the drive shaft 12.

Figure 3:
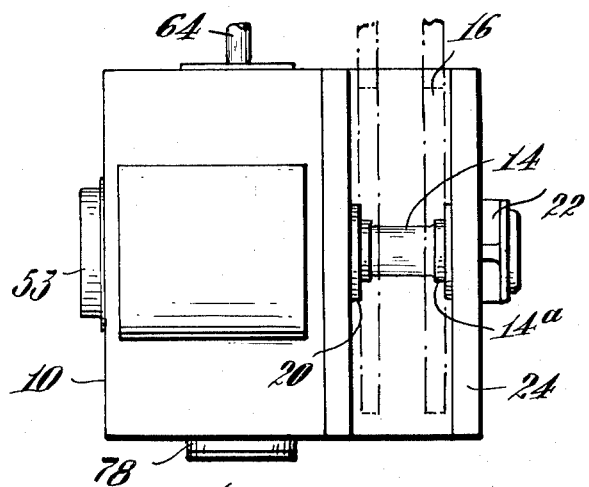
FIG. 3 is a plan view of the speed-reducer.

Referring to FIG. 3, it becomes apparent that the arrangement of the input and output shafts of the speed-reducer and the location of the shear connection and change gears provides for an extremely compact driving unit which takes up very little space and is adapted to be disposed beside the machine to be driven rather than at the end so as to reduce the overall length of the machine with which it is used.

The foregoing features, namely, the provision of means for enabling replacement of a broken shear coupling; substitution of change gears without dismantling or disturbing the unit as a whole; and of providing a compact drive which takes up little space, substantially eliminates the disadvantages of the conventional drive.

It should be understood that the present disclosure is for the purpose of illustration only and that this invention includes all modifications and equivalents which fall within the scope of the appended claims.

I claim:

1. A drive comprising a housing having a side wall, a shaft journaled in the housing between opposed portions of the side wall with one end projecting from one side wall portion of the housing, an outboard bearing spaced from said one side wall portion of the housing supporting the projecting end of the shaft, driving means mounted on and secured to the projecting end of the shaft between said one side wall portion of the housing and the outboard bearing, a drive gear on the shaft within the housing, said drive gear being situated at the opposite end of the shaft adjacent the other side wall portion of the housing, and said other side wall portion of the housing having an opening therein, a sleeve splined to the shaft between said shaft and the drive gear, said sleeve having a radial flange adjacent the outer side of the gear situated within said opening, said flange and said drive gear containing registering holes parallel to the axis of said shaft, shear pins situated in said registering openings providing a driving connection between said drive gear and shaft, and means in the housing operative to turn said drive gear.

2. A drive comprising a housing having a wall containing opposed aligned openings, bearings supported within said openings, a shaft mounted in said bearings with one end projecting from one of the bearings, an outboard bearing spaced from and aligned with said one of the bearings, supporting the outer end of the projecting portion of the shaft, driving means mounted on and fixed to the portion of the shaft between said one bearing and the outboard bearing, a drive gear on the opposite end of the shaft having a hub supported in the other bearing, the outer side of the hub being accessible through the opening within which said other bearing is supported, said hub containing a hole of larger diameter than the shaft providing an annular space surrounding the shaft, a sleeve splined to the shaft within said annular space, said sleeve containing a peripheral groove at its inner end and a radial flange at its outer end, a ring bearing situated within said peripheral groove against the inner side of the hub, a cover plate secured to the outer end of the shaft against the outer end of the sleeve, said ring bearing and cover plate collectively preventing endwise movement of the gear on the shaft, said flange at the outer end of the sleeve overlying the outer end of the hub, and said flange and hub containing registering holes, the axes of which are parallel to the axis of the shaft, a shear pin mounted in the holes, said shear pin providing the sole driving connection between the shaft and the drive gear, and power-operable means in the housing operatively engaged with the drive gear to turn the drive gear.

3. A drive comprising a housing, a first pair of parallel shafts journaled in the housing, one of the shafts having an end projecting from the housing, driving means mounted on said projecting end of the one shaft, means on the shaft within the housing drivably connecting the one shaft to the other, a second pair of shafts journaled in the housing at right angles to the first pair of shafts, a motor situated externally of the housing drivably connected to one end of one of the second pair of shafts, the opposite end of said one of the second pair of shafts and the adjacent end of the other of said second pair of shafts projecting from the housing, change gears on said projecting ends of the second pair of shafts, said change gears being removable and replaceable without dismantling the drive, and means on said other shaft of the first pair of shafts drivabaly connecting it to the one shaft of the first pair of shafts.

4. A drive comprising a housing, a first shaft journaled in the housing with a portion projecting from the housing and with its axis horizontal, driving means mounted on and fixed to the projecting portion of the shaft, a drive gear mounted on the first shaft situated inside the housing and secured thereto by a shear coupling, a motor situated adjacent the housing with its drive shaft at right angles to said first shaft and parallel to the median plane of the driving means, means situated in the housing drivably connecting the motor shaft to said drive gear including a pair of shafts journaled in the housing at right angles to the first shaft, the axis of one of said pairs of gears being aligned with the motor shaft and having an end protruding from one side of the housing for connection to the motor shaft, the other end of said pair of shafts projecting from the housing at the side remote from the motor, and a pair of meshing change gears mounted externally of the housing on the projecting ends of the pair of shafts so as to be replaceable without disconnecting the motor, said housing containing an opening concentric with the first shaft at the side remote from the driving means, and said shear coupling being removable through said opening from externally of the housing without access to the interior thereof.

5. A drive comprising a housing, first and second pairs of parallel shafts journaled in the housing at right angles to each other, one of the shafts of the first pair projecting from the housing, driving means fixed to the projecting end of said one shaft, means in the housing drivably connecting the shafts of the first pair, said means including a shear coupling accessible exteriorly of the housing at a side remote from the projecting end of said one shaft for replacement without entering the housing, a motor externally of the housing with its drive shaft aligned with one of the shafts of the second pair of shafts, said one shaft of said second pair of shafts having one end projecting from the housing for connection to the motor shaft and the other end projecting from the housing remote from the motor, and said other shaft of the second pair of shafts having an end projecting from the same side of the housing, a pair of change gears mounted on the projecting ends of the second pair of shafts externally of the housing drivably connecting said second pair of shafts, said externally mounted change gears permitting substitution of gears of different ratios without disconnecting the motor, and means within the housing drivably connecting the shafts of the two pairs of shafts, said housing constituting a reservoir for holding a quantity of oil sufficient to immerse said shafts and said driving connection.

6. A device comprising a housing, a first shaft journaled in the housing with an end projecting from the housing, driving means fixed to the projecting end of the first shaft, parallel second and third shafts journaled in the housing at right angles to the first shaft, said second shaft having ends projecting from the housing, a motor connected to one of the projecting ends of the second shaft, a gear mounted on the other projecting end of said second shaft, said third shaft having an end projecting from the housing next to said other projecting end of said second shaft, a gear mounted on said projecting end of said third shaft in mesh with the gear on said other projecting end of said second shaft, said gears being situated externally of the housing and removable from said shafts for substitution of gears of different ratio, a fourth shaft journaled in the housing parallel to said first shaft, a worm and worm wheel drivably connecting the second and third shafts, and a pair of meshing gears drivably connecting said first and fourth shafts.

7. A drive according to claim 6, wherein a shear coupling connects the gear on the first shaft thereto, and said housing contains an opening remote from the driving means through which access is afforded to permit replacement of the shear coupling following failure.

References Cited by the Examiner
UNITED STATES PATENTS

| | | | |
|---|---|---|---|
| 1,493,188 | 5/1924 | Campbell | 64—28 |
| 1,574,466 | 2/1926 | Brown | 64—28 |
| 2,351,060 | 6/1944 | McLauthlin | 74—421.5 |

DON A. WAITE, *Primary Examiner.*